Patented July 18, 1950

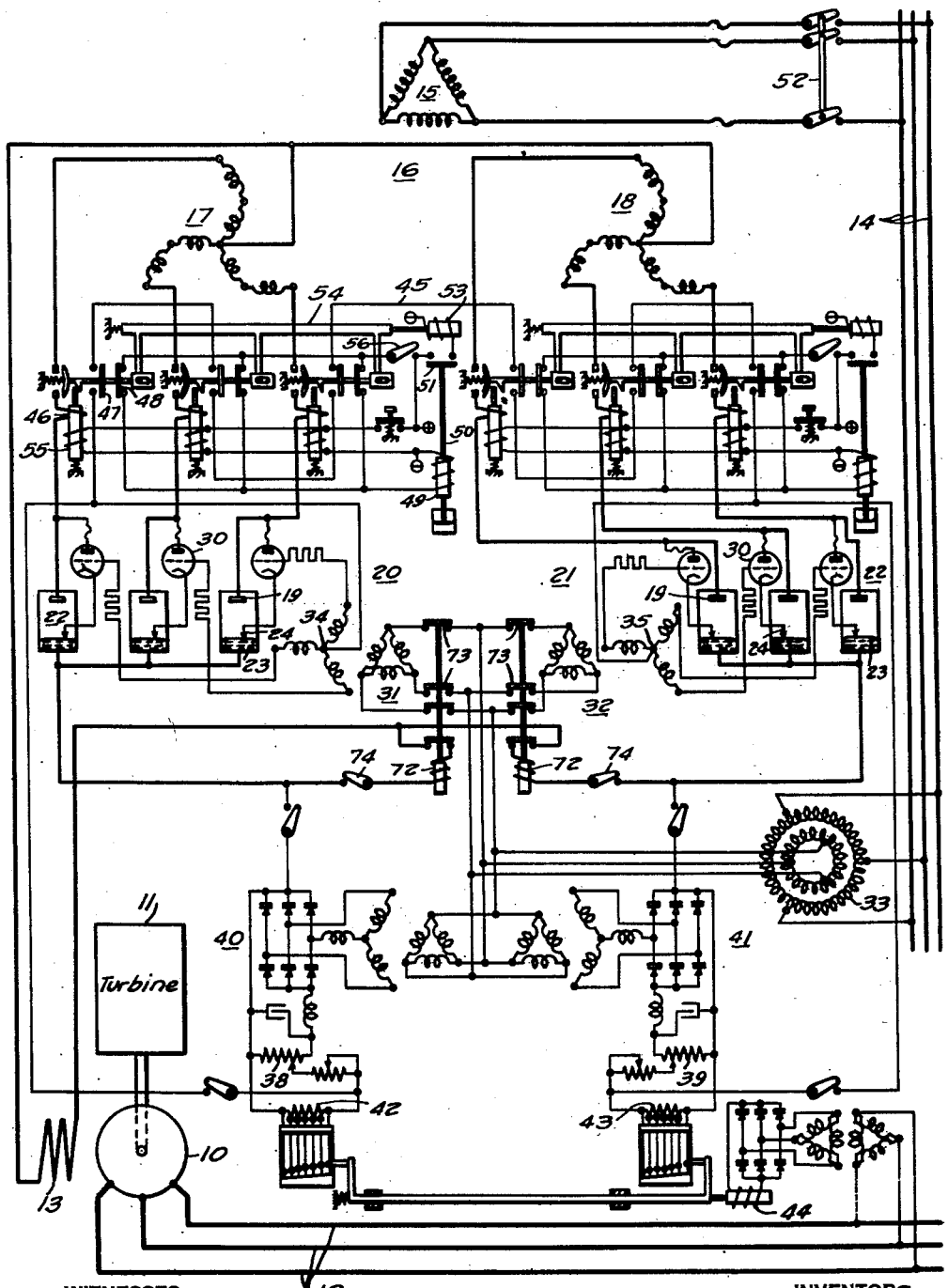

2,515,989

UNITED STATES PATENT OFFICE 2,515,989

CONTROL SYSTEM

Joseph H. Cox and Herbert A. Rose, Pittsburgh, Pa., assignors to Westinghouse Electric Corporation, East Pittsburgh, Pa., a corporation of Pennsylvania Application November 29, 1944, Serial No. 565,729

6 Claims. (Cl. 321—39)

Our invention relates to a control system, and particularly to a rectifier system for supplying excitation current to a dynamoelectric machine.

Direct-connected direct-current exciters for large dynamoelectric machines, such as alternating-current turbo-generators, slow-speed water-wheel generators, synchronous condensers and high-speed motors, present difficult mechanical problems and/or become costly due to size and speed. Separate motor-generator sets have been used in numerous cases, but these sets present some disadvantages in reliability, synchronous stability, speed of voltage response and cost. Vapor electric devices, such as ignitrons, have also been used and possess certain advantages over direct-connected or motor-generator exciters.

The system according to our invention presents an exciter system having improvements over the prior art as regards simplicity of operation and reliability as measured in terms of continuity of service of the principal dynamoelectric machine.

The system according to our invention comprises a plurality of similar in-phase rectifiers for supplying unidirectional exciting current from a source of reliable alternating-current. The alternating-current supply is connected to the direct-current exciter circuit by means of a distribution transformer which contains a plurality of similar in-phase secondary windings, each of the secondary windings distributing potential to an individual rectifier, the rectifiers being connected in parallel to the exciter circuit, each of the rectifiers and its associated transformer winding having sufficient capacity so that it may supply as much exciting current as may be needed for any contemplated emergency. The rectifiers are preferably constructed of a plurality of sequentially conducting vapor electric valves, preferably of the make-alive type. With this arrangement, it is possible to replace any electric valve without loss of excitation to the field or upsetting normal load operation of the dynamoelectric machine. The secondary transformer elements being identical in phase and mechanical construction makes it possible to do this without changing the magnitude of voltage or current ripple supplied to the exciter circuit.

It is an object of our invention to provide a simple and reliable exciter system for a dynamoelectric machine.

It is a further object of our invention to provide a vapor electric exciter system.

A further object of our invention is to provide an exciter system in which individual components may be replaced without disturbing operation of the excited machine.

It is a further object of our invention to provide an exciter system using a plurality of similar parallel-connected rectifiers.

Other objects and advantages of our invention will be apparent from the following detailed description, taken in conjunction with the accompanying drawing, in which the figure is a schematic illustration of a system according to our invention.

According to the exemplary embodiment of our invention, the dynamoelectric machine herein shown as a generator 10 driven by a prime mover 11 is connected to an alternating-current load circuit 12. However, it is apparent that the dynamoelectric machine 10 instead of being a generator could be a motor or synchronous condenser.

The conditions of the dynamoelectric machine 10 is controlled by an exciter winding 13, the energy of which is supplied from a reliable alternating-current source (not shown), but the connections 14 of which are led to a primary winding 15 of a distribution transformer 16 which has a plurality of similar in-phase secondary windings 17—18, herein shown as two in number, of the zig zag type to prevent saturation when direct-current components are drawn from only a portion of the windings.

Each of the secondary windings 17—18 distributes current to the anodes 19 of individual rectifiers 20—21, each of the rectifiers 20—21 being composed of a plurality of periodical and sequentially conducting vapor electric valves 22, preferably corresponding in number to the phase terminals of the secondary windings 17—18. While any type of vapor electric valve 22 could be utilized, we prefer to use a make-alive type valve as shown broadly in Patent 2,069,283 in which each valve is a unit comprising an anode 19 and a vaporizable reconstructing cathode 23 of suitable material, such as mercury, with a make-alive electrode 24 in contact with the cathode 23. The individual rectifiers 20—21 are connected in parallel to the exciter circuit 13, and the excitation of the make-alive electrodes 24 is controlled to vary the current flowing in the exciter winding 13.

An impulsing system is provided for each of the rectifiers 20—21, the impulsing system being so connected as to supply periodic successive impulses to the various make-alive electrodes 23. While any suitable impulsing system may be utilized, for simplicity of illustration, we have shown a so-called anode firing system in which an auxiliary electric valve 30 is connected between the anode supply and the make-alive electrode 24, and the auxiliary valve 30 is grid-controlled to determine the instant of application of the make-alive impulse.

The auxiliary electric valves 30 are controlled by means of alternating-current control transformers 31—32 which is supplied with potential from any source of suitable frequency and herein illustrated as being supplied from the auxiliary bus 14 supplying the main transformer 16. Preferably, a phase-shifting device, such as an induction phase shifter 33, is supplied between the source 14 and the control transformers 31 and 32, so that all of the control transformers 31, 32 may have their phase shifts in unison.

A further control is provided by applying a biasing potential to the mid-taps 34 and 35 of the secondary winding of the control transformers 31 and 32. Preferably, a source of biasing potential is supplied for each of the impulsing systems. We have herein shown the biasing potentials as being supplied from an alternating-current source such as 14 by means of full-wave rectifiers 40 and 41. Obviously, any suitable source of direct-current potential might be utilized.

The biasing potential applied to the impulsing system is modified in response to the condition of the dynamoelectric machine 10. We prefer to modify this potential by means of an impedance herein shown as variable resistors 42 and 43 connected across the terminals of the biasing potential source. For purposes of illustration, we have shown the variable impedances 42 and 43 as of the type known commercially as a "Silverstat." The variable impedances 42 and 43 is controlled by coil 44 in response to any desired condition of the machine 10, herein shown as the terminal voltage, although obviously it could be load current or power factor as well.

In order to provide maximum stability, the various biasing potentials are connected together by connection 45 during normal operation of the converters 20 and 21, so as to insure substantially uniform load distribution between various converters 20 and 21. However, in the event of a fault in any of the converters 20 or 21, it is desirable to break the connection 45 between the various biasing potentials so that the healthy converter or converters may continue to supply the load 13 without interference from any condition existing in a faulting converter.

In some installations the phase shifter 33 may be omitted and the phase shift secured by adjusting the biasing potential by any means such as the voltage dividers 38, 39.

To insure maximum reliability of the converters, each of the anode leads has been provided with an individual reverse current breaker 46 so that, in the event of reverse current to any anode 19, the associated breaker 46 will open, discontinuing the reverse current to the faulting anode and allowing the healthy anodes to continue to carry their portion of the load. We prefer to utilize the anode breakers 46 to control the connection 45 between the various biasing potentials. For this reason, we have provided auxiliary contacts 47 on each of the individual breakers 46 and connected these auxiliary contacts 47 in series in connection 45, so that the opening of any of the individual breakers 46 will disconnect the biasing potential of that source from any other non-faulting converter.

In the event an individual breaker 46 fails to open, or the opening of the breaker 46 fails to clear the fault, it is sometimes desirable to place an auxiliary breaker 72 between each of the converters 20—21 and the exciting circuit 13. Preferably, this breaker 72 is so timed that it will not operate until after the individual breakers 46 have had time to normally discontinue the fault.

In the event the cathode breaker 72 is utilized, it is also desirable to discontinue the control impulses for the faulting converter; and to accomplish this we have shown auxiliary contacts 73 carried by the cathode breaker 72 for disconnecting the alternating-current energy supplied to the control transformer 31 or 32 of the faulting rectifier.

When extreme precautions are not necessary the breaker 72 may be omitted and its functions performed by a simple disconnect 74 and the contacts 73 either operated manually or interlocked with the breakers 46. Also in some cases the breakers 46 may be operated in multiples.

In order to maintain maximum stability, it is desired to reclose any anode once the fault has been cleared. To accomplish this, we provide each of the individual breakers 46 with an auxiliary contact 48 so that when the breaker 46 opens it will energize the closing coil 49 of a time-delay relay 50 which, after a predetermined interval, will close its contacts 51 to energize the setting motor, shown for simplicity on a coil 53 of the setting device 54 which will close in any opened breaker 46. If desired, each of the individual breakers 46 may be supplied with a shunt trip 55 so that all of the breakers 46 may be opened at will to shut down the device or to provide isolation of the valves 22 during maintenance or repair thereof.

In the operation of the system according to our invention, the switch 56 will be closed energizing coil 49 of relay 50 which closes its contacts 51 supplying energy to the closing coil 53 closing in the individual breakers 46 of all of the converters 20—21, after which the cathode breakers 72 will be closed, connecting the cathodes 23 to the exciting system 13 and also connecting alternating-current to the control transformers 31 and 32. This initiates the control impulses so that current is carried through all of the converters 20—21 from the alternating-current circuit 14 to the exciting circuit 13. The phase shifter 33 is then adjusted to establish a predetermined condition for the dynamoelectric machine 10 and the biasing potentials are adjusted by voltage dividers 38 and 39 as may be necessary to maintain this condition. Any variation from this condition will actuate the device 44 for changing the variable impedances 42 and 43 to change the biasing potential applied to the control transformers 31 and 32, and thus advance or retard the firing impulses to maintain the condition of the dynamoelectric machine 10 as established by the main phase shifter 33.

In the event of a fault in any valve 22 of any converter, its associated breaker 46 will open, allowing the other converter or converters to carry any necessary portion of the load, but the healthy valves of the converter undergoing fault will continue to carry a portion of the load. If the fault should maintain itself after the opening of the individual breakers 46, the cathode breaker 72 would also open, discontinuing the control impulses and closing down all valves 22 in the converter undergoing fault conditions. However, the individual breaker 46 should clear the fault as is normally the case. The opening of that breaker 46 would initiate a time reclosing action to reclose the individual breaker 46 and restore the converter to normal operation.

Since the windings 17 and 18 are in-phase the shutting down of one of the parallel rectifiers 20—21 would not affect the voltage on the ripple supplied by the rectifiers to the exciting circuit 13.

While for purposes of illustration we have shown and described a specific embodiment of our invention, it will be apparent to those skilled in the art that changes and modifications can be made therein without departing from the true spirit of our invention.

We claim as our invention:

1. A supply system for an exciting winding comprising a transformer including a plurality of similarly disposed polyphase independent secondary windings and a primary winding, connections for impressing polyphase alternating-current power on said primary winding, substantially similar valve-type converters connected to the respective secondary windings, switching means for connecting said converters in parallel to the exciting winding, each of said converters having sufficient capacity to supply said exciting winding, each of said converters including a plurality of make-alive type electric valves, each valve including a main anode, a cathode and a make-alive electrode, an impulsing system for each converter, said impulsing system being connected to successively supply periodic impulses to the make-alive electrodes of the valves, a source of biasing potential for the impulsing system of each converter, means including a variable resistor for each biasing potential for impressing the potential of said sources on the respective impulsing systems, load responsive means for varying said variable resistors, and means responsive to reverse current flow through any converter to discontinue the impulses to the exciting electrodes in the valves thereof.

2. An exciting system comprising a direct-current exciting circuit, a polyphase supply circuit, transformer means energized from said polyphase circuit, said transformer means including a plurality of closely coupled in-phase polyphase zig-zag windings, a valve-type converter connected to each of said windings, each of said converters including a plurality of valves corresponding to the phase terminals of said windings, each of said converters having sufficient capacity to supply said exciting circuit, means for connecting said converters in parallel to said exciting circuit, a separate impulsing circuit for each of said converters for periodically exciting the valves thereof, a source of biasing potential for each of said impulsing circuits, means for normally connecting said sources of biasing potential together, and means responsive to fault conditions in any of said converters for disconnecting said sources from each other.

3. A supply system for a direct current control circuit, comprising a polyphase power supply circuit, a plurality of valve-type converters for transferring power between said circuits, transformer means including a plurality of in-phase zig-zag closely-coupled windings for distributing current to said converters, an impulsing system for each of said converters, said impulsing systems being in phase with each other, a phase-shifting device for simultaneously controlling said impulsing systems, a source of biasing potential for each impulse system, impedance means responsive to change of condition in said circuit for varying the potential from said sources applied to the impulsing systems, connections operative during normal operation of said converters to tie the said biasing source together, and switching means responsive to fault in any of said converters for opening said connections.

4. A power supply system for a load circuit requiring extreme dependability comprising an alternating current supply circuit, a transformer energized from said circuit, a plurality of electrically independent in-phase secondary windings in said transformer, a vapor electric converter connected to each of said secondary windings, each of said converters including a valve for such phase terminal of the respective secondary winding, each of said valves including a main anode and cathode and a periodic exciting electrode, an impulsing system for each of said converters, a common phase shifter for each of said impulsing systems, a biasing potential for each impulsing system, an impedance for varying the biasing potentials applied to the impulsing systems, a common means for varying said impedances, switching means connected in series with each of said valves, control means for each of said series connected switches responsive to fault in the associated valve to momentarily disconnect the faulty valve, switching means for connecting each converter, to the load circuit, said switching means being responsive to fault in any converter to disconnect the faulty converter from the load circuit.

5. An exciting system for a circuit requiring extreme dependability comprising a transformer including a plurality of substantially independent, similarly disposed, polyphase secondary windings and a primary winding, connections impressing polyphase alternating-current power on said primary winding, substantially similar polyphase valve-type converters connected to the respective secondary windings, switching means for connecting said converters in parallel to the circuit, each of said converters having sufficient capacity to supply the circuit, each of said converters including a plurality of make-alive type electric valves, each valve including a main anode, a cathode and a make-alive electrode, an impulsing system for each converter, said impulsing systems being connected to simultaneously supply successive, periodic impulses sequentially to the make-alive electrodes of the valves of each converter, a source of biasing potential for each converter, means including a variable resistor for each converter for impressing the potential of the respective sources on the respective impulsing systems and means responsive to operation of the circuit for varying said variable resistors.

6. A supply system for an exciting winding, comprising a polyphase alternating-current supply circuit, a transformer energized from said supply circuit, said transformer including a plurality of substantially similar in-phase, polyphase output windings, a valve-type electric converter connected to each of said output windings, switching means for connecting said converters in parallel to the exciting winding, each of said converters including a plurality of sequentially conducting electric valves, each of said valves including a main anode, a cathode, and an exciting electrode, a control circuit for each converter for periodically and sequentially supplying current impulses to said exciting electrodes, a source of bias potential for each of said control circuits and means for simultaneously varying said bias potential, and means responsive to fault conditions in any of said converters for interrupting the current impulses to the valves of the faulty converter.

JOSEPH H. COX.
HERBERT A. ROSE.

REFERENCES CITED

The following references are of record in the file of this patent:

UNITED STATES PATENTS

| Number | Name | Date |
|---|---|---|
| 2,094,376 | Rose | Sept. 28, 1937 |
| 2,220,735 | Smith | Nov. 5, 1940 |
| 2,235,398 | Cox et al. | Mar. 18, 1941 |
| 2,243,571 | Moyer et al. | May 27, 1941 |
| 2,246,173 | Herskind | June 17, 1941 |
| 2,272,754 | Stratton | Feb. 10, 1942 |
| 2,288,016 | Myers | June 30, 1942 |
| 2,313,957 | Myers | Mar. 16, 1943 |
| 2,342,791 | Cox | Feb. 29, 1944 |
| 2,397,089 | Cox et al. | Mar. 26, 1946 |